United States Patent [19]

Tamura et al.

[11] Patent Number: 4,821,726
[45] Date of Patent: Apr. 18, 1989

[54] ELECTRONIC FUEL INJECTION DEVICE

[75] Inventors: Hiroshi Tamura, Oobu; Shunichiro Hiromasa, Okazaki; Toshio Kondo, Kariya, all of Japan

[73] Assignee: Nippondenso Co., Ltd., Kariya, Japan

[21] Appl. No.: 118,675

[22] Filed: Nov. 9, 1987

[30] Foreign Application Priority Data

Nov. 7, 1986 [JP] Japan .................. 61-263971

[51] Int. Cl.⁴ ........................................ F02M 51/04
[52] U.S. Cl. ................................ 123/498; 123/512; 417/322; 417/521
[58] Field of Search ............... 123/445, 497, 498, 499, 123/512; 417/322, 521

[56] References Cited

U.S. PATENT DOCUMENTS

| | | | |
|---|---|---|---|
| 3,418,980 | 12/1968 | Benson | 123/498 X |
| 4,022,174 | 5/1977 | Brinkman | 123/499 X |
| 4,230,273 | 10/1980 | Claxton et al. | |
| 4,235,375 | 11/1980 | Melotti | |
| 4,499,878 | 2/1985 | Igashira et al. | |
| 4,649,886 | 3/1987 | Igashira et al. | |

FOREIGN PATENT DOCUMENTS

| | | |
|---|---|---|
| 164660 | 8/1985 | Japan . |
| 25946 | 2/1986 | Japan . |
| 108865 | 5/1986 | Japan . |

*Primary Examiner*—Tony M. Argenbright
*Attorney, Agent, or Firm*—Cushman, Darby & Cushman

[57] ABSTRACT

An electronic fuel injection device for pumping fuel to an internal-combustion engine by using the expansion-contraction characteristics of a piezoelectric device. The electronic fuel injection device has a pump member integrally formed and having a number of pistons corresponding to the number of cylinders of the associated internal-combustion engine, and a single actuator for driving the pump member. Accordingly, the same pressure is generated in all of the pump chambers when the pump member is driven by the actuator for each fuel injection cycle. Each pump chamber is connected to a fuel feed passage connected to a fuel tank and to a fuel injection passage connected to a fuel injection nozzle, and is filled with the fuel. The pump chambers are pressurized uniformly to distribute the fuel uniformly to the cylinders regardless of the passage characteristics of the fuel injection passages.

22 Claims, 6 Drawing Sheets

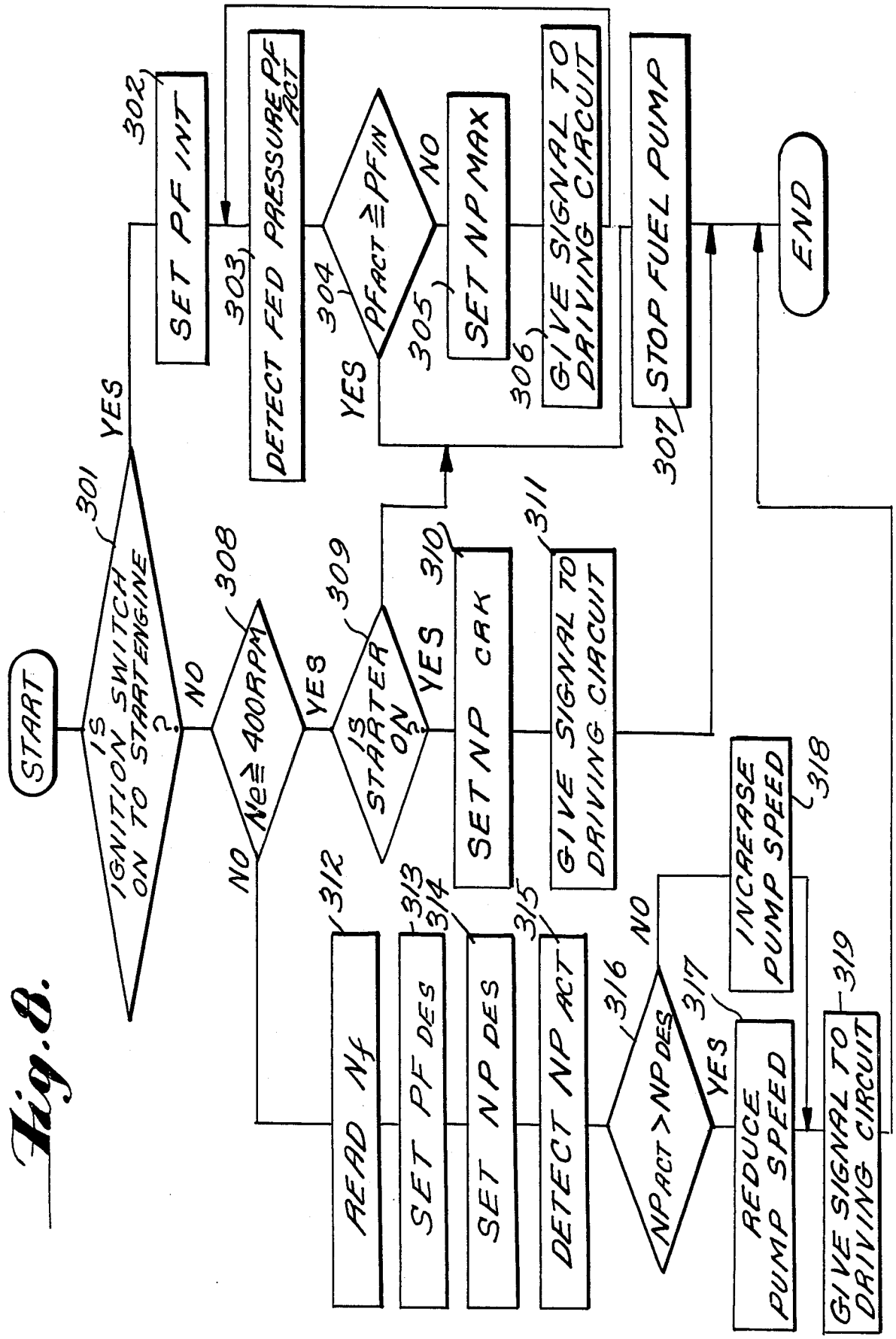

ELECTRONIC FUEL INJECTION DEVICE

BACKGROUND OF THE INVENTION

1. Field of the Invention

The present invention relates in general to fuel injection devices for a spark-ignition internal-combustion engine. More specifically, the invention provides an electronically controllable piezoelectric fuel injection device.

2. Description of the Prior Art

Japanese Patent Provisional Publication (Kokai) No. 60-164660A discloses a piezoelectric fuel injection valve integrally comprising a pump, a piezoelectric actuator for driving the pump, and an injection nozzle. In that piezoelectric fuel injection valve, the piezoelectric actuator is driven at a high frequency for fuel injection. Accordingly, it has response characteristics superior to those of a solenoid type fuel injection valve in Which the pump is driven by a solenoid actuator.

However, if this known piezoelectric fuel injection valve is to be used in a multicylinder engine, a separate and distinct piezoelectric fuel injection valve must be provided for each cylinder. A fuel injection system including a plurality of such piezoelectric fuel injection valves is costly. Furthermore, the difference in operating characteristics among the various piezoelectric actuators causes irregular fuel distribution among the cylinders.

Japanese Patent Provisional Publication (Kokai) No. 61-108865 discloses a piezoelectric fuel injection device, which comprises a single pump and a single piezoelectric driving unit for driving the pump to distribute fuel pressurized by the pump to a plurality of injection nozzles respectively provided for a plurality of cylinders. The pump has only a single pump chamber connected to a plurality of injection nozzles by a plurality of pipes. Although only a single piezoelectric fuel injection device is used (as opposed to one for each cylinder), the difference in pipe flow characteristics among the various pipes causes irregular fuel distribution among the fuel injection nozzles.

SUMMARY OF THE INVENTION

Accordingly, it is a principal object of th present invention to provide an electronic piezoelectric fuel injection device capable of uniformly distributing fuel to the cylinders of a multicylinder engine.

It is another object of the present invention to provide an integral piezoelectric fuel injection device which can be manufactured at a low cost, can be mounted on an engine without much difficulty and can have its various parts easily replaced.

The present invention provides a fuel injection device having a single pump driven by a single piezoelectric driving unit. The pump has a plurality of pump chambers connected to respective injection nozzles by respective fuel injection pipes. Each injection nozzle injects fuel into a single cylinder of the engine.

The fuel injection device is an integrally formed unit including a plurality of pump chambers, a plurality of injection nozzles and fuel passages, which can be easily mounted on and removed from an engine.

BRIEF DESCRIPTION OF THE DRAWINGS

FIG. 8 is a flow chart setting forth various steps of a control. program for controlling an electric fuel injection pump.

DESCRIPTION OF THE PREFERRED EMBODIMENT

The following is a detailed description of the embodiments constituting the best mode known to the inventors at the time of the filing of this application for practicing the invention.

Figure 1:
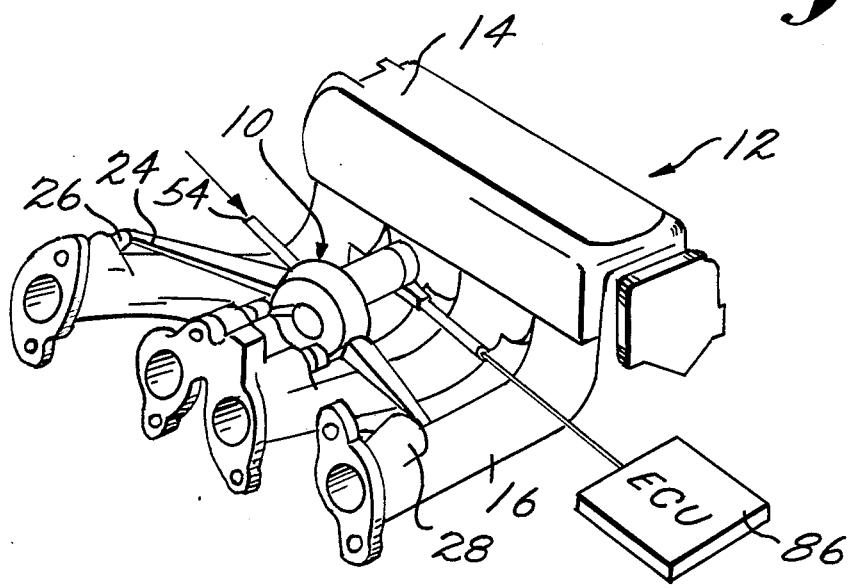
FIG. 1 is a perspective view showing a fuel injection device according to the present invention installed on an internal combustion engine.

FIG. 1 is a perspective view showing a fuel injection device according to the present invention installed on an internal combustion engine. In this particular embodiment, a fuel injection device 10 according to the present invention is designed for application to a four-cylinder engine. Of course, the use of four cylinders is only illustrative. A suction system 12 includes a surge tank 14 and four suction pipes 16 combined with the surge tank. The fuel injection device 10 is secured to the suction pipes 16.

Figure 2:
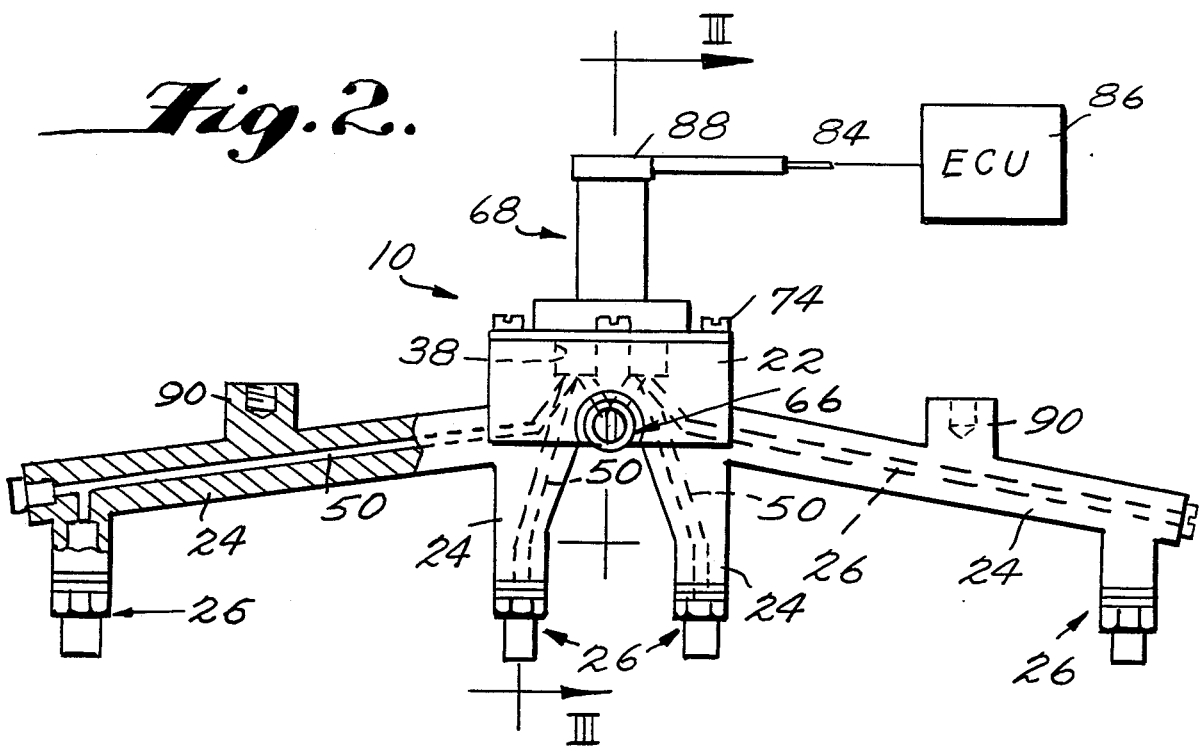
FIG. 2 is a partially cutaway plan view of the fuel injection device of FIG. 1.
Figure 3:
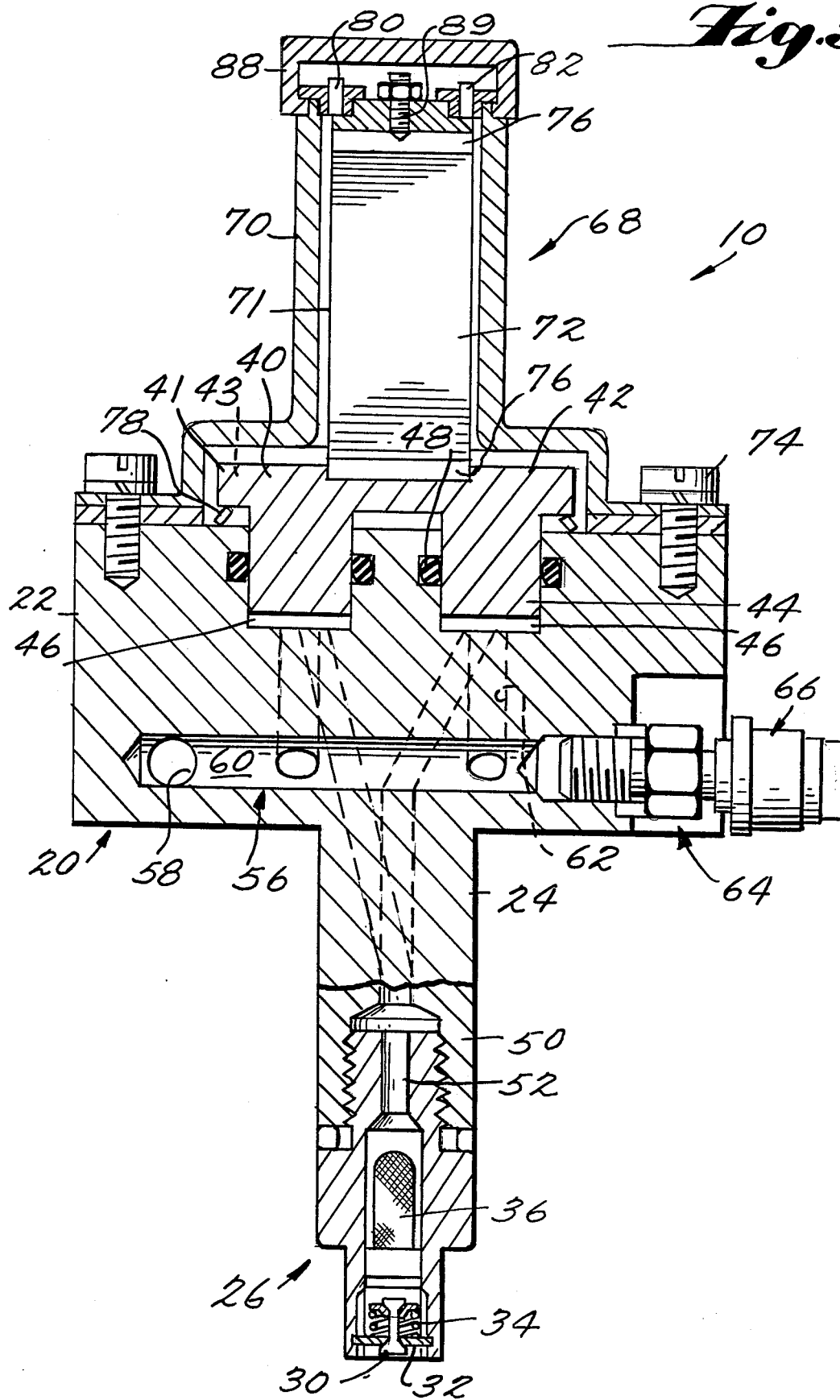
FIG. 3 is a sectional view taken along line III—III in FIG. 2.

FIG. 2 is a partially cutaway plan view of the fuel injection device of FIG. 1 and FIG. 3 is a sectional view taken along line III—III in FIG. 2. Referring to FIGS. 1 to 3, the fuel injection device 10 in this embodiment is formed as an integral unit having a main body 20. The main body includes a cylindrical central part 22 and four branch parts 24 extending from the central part. The main body 20 may be formed by casting an aluminum alloy in an integral member. Injection nozzles 26 are screwed on the respective free ends of the branch parts 24, respectively. Each branch part 24 is formed in a shape nd size to dispose the injection nozzle 26 at a nozzle holding part 28 (FIG. 1) on the corresponding suction pipe 16. The fuel injection nozzle 26 is of the conventional type having a poppet valve 30, a valve seat 32, a spring 34 for continuously biasing the poppet valve 30 closed and a fuel filter 36. The valve opening pressure of the injection nozzle 26, for example, is on the order of 2 to 3 kg/cm$^2$.

Four bores 38 are formed in the central part 22 of the main body 20. The central part 22 and a pumping member 40 are combined to form a pump 42.

Figure 4:
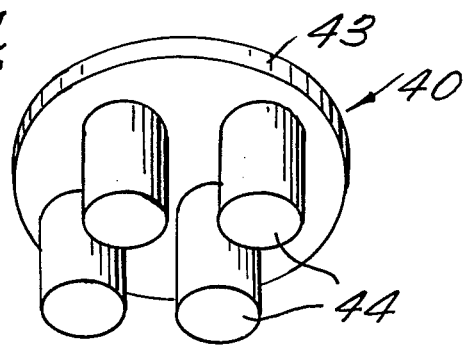
FIG. 4 is a bottom perspective view of a pumping member employed in the fuel injection device of FIG. 1.

FIG. 4 is a bottom perspective view of a pumping member employed in the fuel injection device of FIG. 1. As is apparent from FIG. 4, the pumping member 40 has four pistons 44 formed integrally with a base 43. The pistons 44 are arranged at equal angular intervals on a circle having its center on the axis of the pumping member 40. The pistons 44 are fitted in the bores 38 to form pump chambers 46, respectively, as shown in FIG. 3. Since this embodiment is designed for application to a four-cylinder engine, the pump 42 has four pump chambers. A sealing member such as an O-ring 48 in an open annular groove formed in the bore 38 or an open annular groove formed in the circumference of the piston 44 ensures watertight engagement of the bore 38 and the piston 44 even if the bore 38 and the piston 44 are not machined with a very high precision.

The pump chambers 46 are connected to the fuel inlet ports 52 of the fuel injection nozzles 26 by fuel injection passages 50 extending through the central part 22 and branches of the main body 20, respectively.

Preferably, the respective portions of the fuel injection passages 50 extending between corresponding pump chambers 46 and the fuel inlet ports 52 of the corresponding fuel injection nozzles 26 are the same in volume to reduce the difference in fuel injection rate among the various cylinders.

Fuel of a low pressure is supplied to the pump chambers 46 through a fuel inlet fixture 54 (FIG. 1) and a fuel supply passage 56 formed in the central part 22 of the main body 20 (FIG. 3). The fuel supply passage has a passage 58 extending in line with the fuel inlet fixture 54 (a passage extending perpendicularly to the sheet on which FIG. 3 is drawn), a transverse passage 60 and branch passages 62 respectively opening into the pump chambers 46 as shown in FIG. 3.

It is desirable, in order to check the reverse flow of the fuel resulting from the pumping action of the pistons 44, to provide check valves in the fuel injection passage 50 communicating with the pump chambers, and the branch passages 62.

The presence of air or fuel vapor within the fuel injection passage 50, the fuel supply passage 56 and/or the pump chambers 46 may cause the engine to falter or even stall. Accordingly, it is preferable to provide an air vent 64 for removing air and/or vapor from the fuel (FIG. 3). In this embodiment the air vent 64 includes a conventional air vent valve 66 disposed in the transverse passage 60 formed in the central part 22 of the main body 20. The air vent valve 66 is opened manually to remove air together with some of the fuel.

The pumping member 40 of the pump 42 is driven for high-speed operation by a single piezoelectric actuator 68. As shown in FIG. 3, the piezoelectric actuator 68 has a casing 70, and a piezoelectric laminate 72 having an axis aligned with the axis of the pump member 40. The casing 70 is screwed detachably to the main body 20 with a plurality of screws 74. Accordingly, the mainbody 20 and the piezoelectric actuator 68 can each be individually replaced. Generally, engines of different types have different positions for the fuel injection nozzles 26. Hence the configuration of the main body 20 of the fuel injection device 10 must be varied with the type of the engine. According to the present invention, the piezoelectric actuator 68 of a fixed configuration can be combined with any one of the main bodies 20 of different configurations for engines of different types. This allows the piezoelectric actuator 68 to be "universally" employed in fuel injection devices of different types for engines of different types. Since multiple designs for the piezoelectric actuator 68 are unnecessary, the manufacturing cost of the fuel injection device is relatively low. If a piezoelectric actuator 68 should fail, it can be easily replaced with a new one.

The piezoelectric laminate 72 is of a conventional type comprising a plurality of piezoelectric ceramic disks laminated in alternate opposite polarities, and electrodes (not shown) provided between the piezoelectric ceramic disks. The piezoelectric laminate 72 is held through a pair of insulating plates 76, between the upper wall of the casing 70 and the pump member 40, and is pressed against the upper wall of the casing 70 with a disk spring 78. As is well known, the electrodes are connected alternately to a plus terminal 80 and a minus terminal 82. The terminals 80 and 82 are connected to an electronic control unit (hereinafter, abbreviated to "ECU") 86 by lead wires 84. The upper portion of the casing 70 is covered with an insulating boot 88. Preferably, part of the fuel is circulated through a space between the casing 70 and the piezoelectric laminate 72 to cool the piezoelectric laminate 72.

Disk spring 78 is preferably disposed concentrically with the piezoelectric laminate 72 between the upper surface of the central part 22 of the main body 20 and the surface of the flange of the pumping member 40 in which the pistons 44 are formed, so as to surround all the pistons 44 as shown in FIG. 3. Such a manner of disposition of the disk spring 78 requires less component parts and less dead volume in the pump chamber 46 as compared with a manner of disposing the disk spring 78 in the pump chamber 46.

The disk spring 78 may be disposed between a plane defined by the pistons 44 of the pumping member 40 and a plane defined by the bores 38 formed in the central part 22 of the main body 20 so as to be opposite to the piezoelectric laminate 72 through the pumping member 40, or two disk springs may be disposed at such positions as shown in FIG. 3. As an alternative, a coil spring can be substituted for the disk spring 78 for applying pressure to the piezoelectric laminate 72.

The extension of the piezoelectric laminate 72 of the fuel injection device 10 may not always coincide with a "standard" extension. Therefore, fuel injection device 10 (see FIG. 3) is provided with an adjusting screw 89 to adjust the extension of the piezoelectric laminate 72 to coincide with a standard extension. In adjusting the extension of the piezoelectric laminate 72, the insulating boot 88 is removed, and then the adjusting screw 89 is turned in either direction to move the piezoelectric laminate 72 axially together with the insulating plates 76, so that the strain of the disk spring 78 is changed to change the pressure acting on the piezoelectric laminate 72. Thus, the extension of the piezoelectric laminate 72 is adjusted to reduce the deviation of the fuel injection rate of the fuel injection device 10 from a standard fuel injection rate.

The integral fuel injection device 10 can be mounted on the suction system 12 of the engine by the use of a fastening a base 90 (FIG. 2) formed integrally with the branches 24 to either suction pipe 16 with bolts. In FIG. 1, the base 90 is not shown.

When the ECU 86 applies a predetermined voltage in a predetermined polarity to the piezoelectric actuator 68, the piezoelectric laminate 72 extends instantaneously to shift the pumping member 40 together with the pistons 44 downward at a high speed to cause a pressure to be formed within the pump chambers. The pressure is propagated through the fuel injection passages 50 to the fuel injection nozzles 26 to lift the poppet valves 30 from the corresponding valve seats 32, and thereby a small quantity of the fuel is injected simultaneously into the respective suction pipes 16 of the cylinders. When the application of the voltage is stopped or when a voltage is applied to the piezoelectric actuator 68 in the reverse polarity, the piezoelectric laminate 72 contracts to move the pumping members 40 upward, so that low pressure fuel can flow through the fuel supply passage 56 into the pump chambers 46. Such a fuel injecting cycle is repeated at a high frequency to inject the fuel into the intake air at a fuel injection rate necessary for the operation of the engine. The fuel injection rate can be regulated, for example, by regulating the number of pumping cycles of the pump 42 for one combustion cycle of the engine, namely, the number of voltage application cycles for applying the voltage to the piezoelectric actuator 68, and the stroke of the pumping members 40 for each pumping cycle, which is a function of the voltage applied to the piezoelectric actuator 68.

Figure 5:
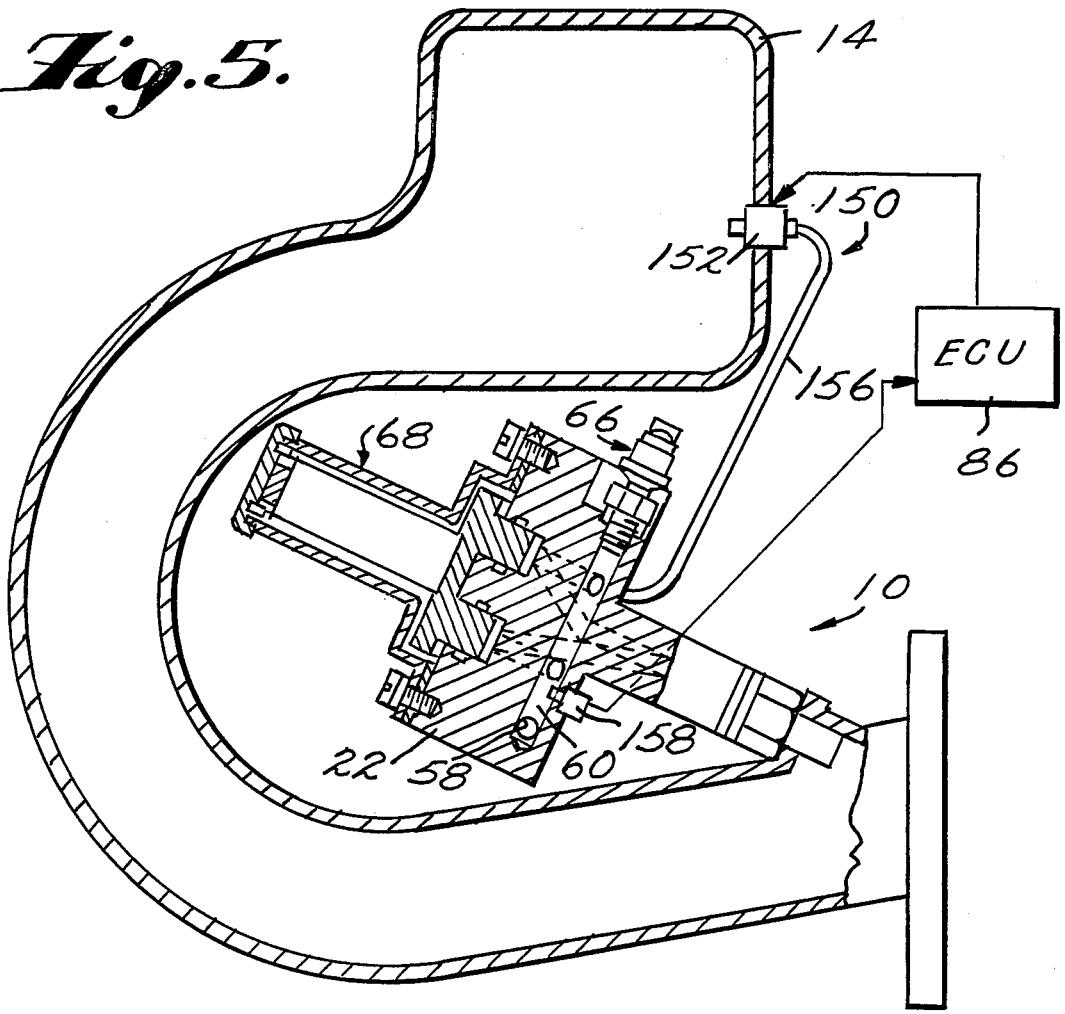
FIG. 5 is an illustration showing a preferable placement of the fuel injection device of FIG. 1.

FIG. 5 illustrates a preferable disposition of the fuel injection device 10. The integral fuel injection device 10 is positioned with the axis thereof inclined at an angle to a horizontal plane. Accordingly, the air vent valve 66 is at a position above the fuel inlet fixture 54, and the transverse passage 60 of the fuel supply passage 56 formed in the central part 22 of the main body 20 is inclined upward toward the air vent valve 66. Therefore, air bubbles and vapor contained in he fuel in the passages 58 and 60 gather near the air vent valve 66 when the fuel injection device 10 is thus mounted on the engine so that air and vapor can easily be purged from the fuel injection device 10.

The fuel injection device 10 shown in FIG. 5 is provided with an electromagnetic air vent 150 in addition to the manual air vent valve 66. The electromagnetic air vent 150 includes a normally closed solenoid valve 152, which is provided on the surge tank 14 and controlled by the ECU 86. The solenoid valve 152 may be a conventional electromagnetic fuel injection valve. The solenoid valve 152 has a fuel inlet 154 connected to an upper part of the transverse passage 60 in the central part 22 of the main body 20 by a pipe 156. A fuel pressure sensor 158 is provided in the passage 60 of the central part 22 of the main body 20 to detect the pressure of the fuel in the passage 60. The output signal of the fuel pressure sensor 158 is provided to the ECU 86. The ECU 86 monitors the fuel pressure in the passage 60 and, when the fuel pressure drops below a predetermined value due to the aeration or evaporation of the fuel, opens the solenoid valve 152 for a predetermined time to discharge the fuel from the passage 60 together with air bubbles and/or vapor into the surge tank 14 for discharging air and/or vapor.

When the fuel injection device 10 is attached to the intake pipe 16 in an inverted position, namely, at a position below the fuel injection nozzles 26, air bubbles contained in the fuel within the fuel injection device 10 are injected into the intake pipes 16 together with the fuel. In such a case, neither the air vent valve 66 nor the air vent 150 is necessary.

Figure 6:
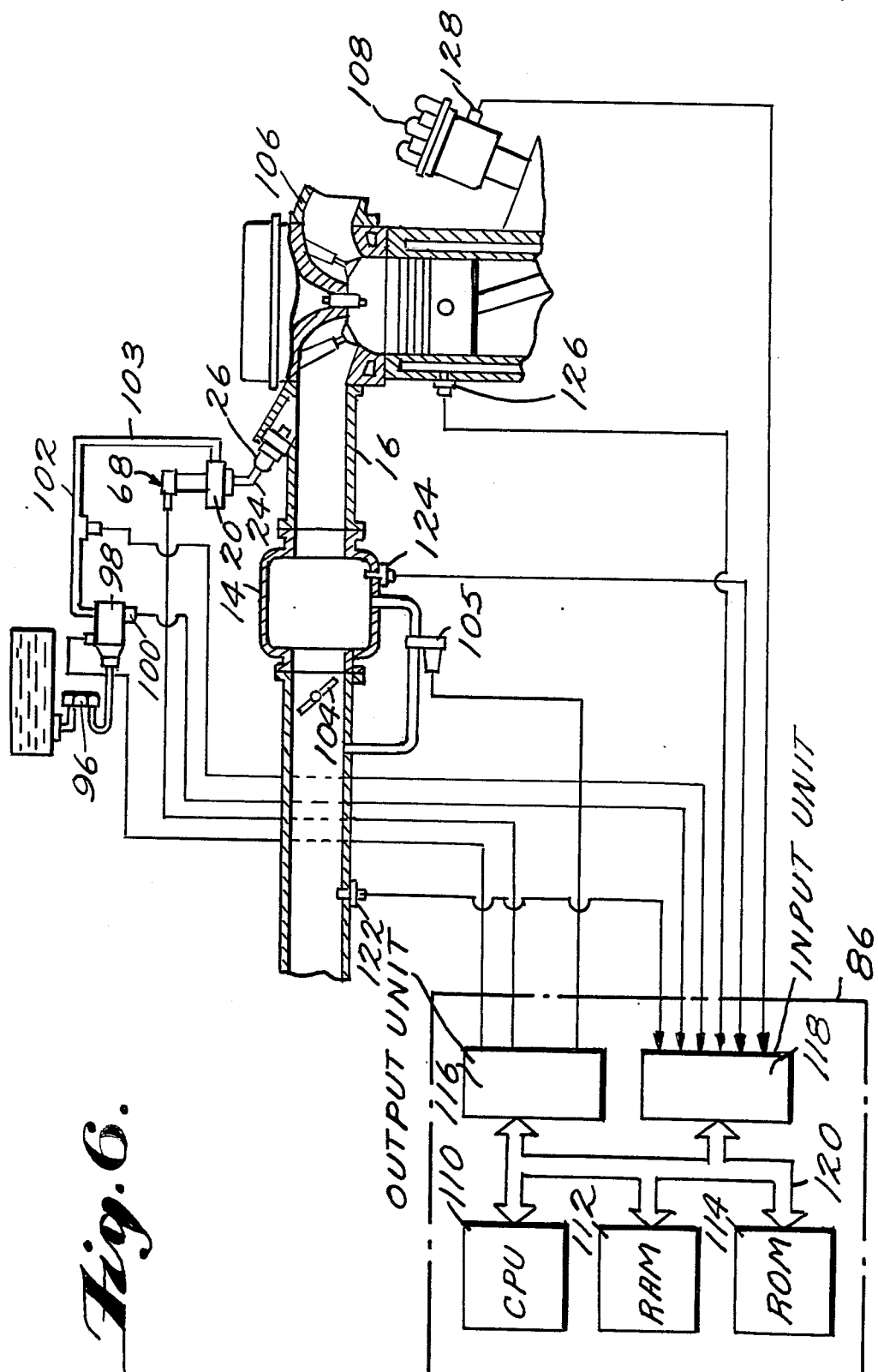
FIG. 6 is a schematic view of the fuel injection device of FIG. 1 mounted on an engine.

FIG. 6 is a schematic view of the fuel injection device of FIG. 1 mounted on an engine. A fuel feed system 92 including the fuel injection device 10 is mounted on an engine. In FIG. 6, there are shown a fuel tank 94, a fuel filter 96, an electric fuel pump 98, a pump speed sensor 100 for detecting the rotating speed of the pump 98, a pressure sensor 102 for detecting feed pressure, namely, the pressure of the fuel in a fuel pipe 103, a throttle valve 104, an idling speed control valve 105, an exhaust manifold 106 and a distributor 108. The ECU 86 comprises a CPU (central processing unit) 110, a RAM (random access memory) 112, a ROM (read-only memory) 114, an output unit 116, an input unit 118 and a bus 120. The output signals of an intake air temperature sensor 122, a suction pressure sensor 124, a cooling water temperature sensor 126, and a crank angle sensor 128 incorporated into the distributor 108 are applied to the input unit 118.

Figure 7:
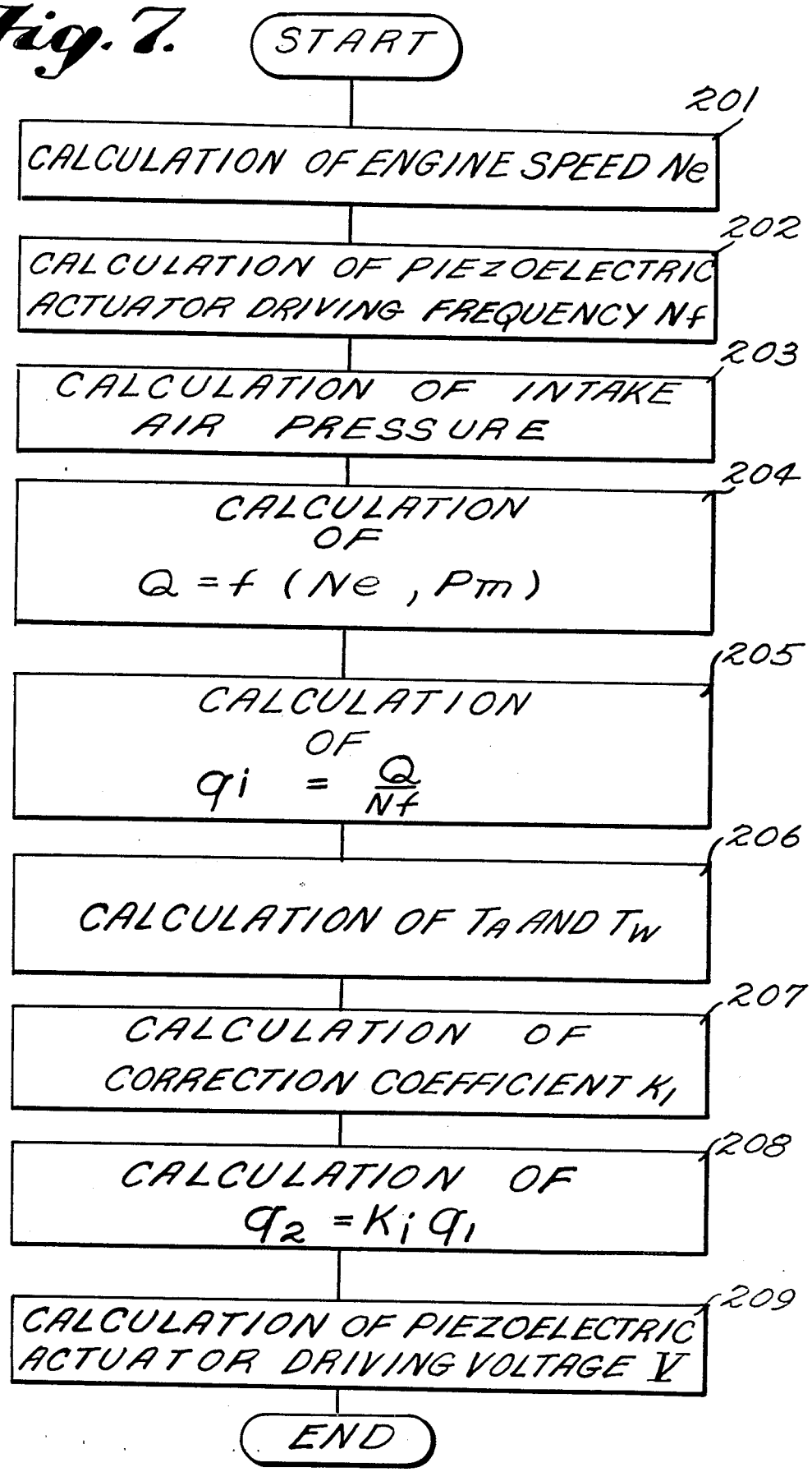
FIG. 7 is a flow chart setting forth various steps of a process for calculating fuel injection rate.

The CPU 110 executes a control routine shown in FIG. 7 for every rotation of the crankshaft through a predetermined angle, for example, 720° for fuel metering. In step 201, engine speed Ne is calculated on the basis of signals provided by the crank angle sensor 128. In step 202, piezoelectric actuator driving frequency Nf for each fuel injection cycle, for example, for every two turns of the crankshaft of the engine, is calculated. The driving frequency Nf is stored in the RAM 112 to be used for controlling the fuel pump. In step 203, suction pressure Pm is calculated on the basis of the output signal of the suction pressure sensor 124. In step 204, a stoichiometric fuel injection rate Q, namely a quantity of the fuel for every combustion cycle (two turns of the crankshaft of the engine), corresponding to the engine speed Ne and the suction pressure Pm (Q =f(Ne, Pm)) is read from a map stored in the ROM 114. In step 205, a stoichiometric fuel injection rate $q_1 = Q/Nf$, namely, a theoretical quantity of the fuel to be injected for one driving cycle of the piezoelectric actuator 68, is calculated. In step 206, intake air temperature $T_A$ and cooling water temperature $T_W$ are calculated on the basis of signals provided by the intake air temperature sensor 122 and the cooling water temperature sensor 126, respectively. In step 207, a correction coefficient $K_1$ is calculated on the basis of the intake air temperature $T_A$ and cooling water temperature $T_W$. In step 208, the stoichiometric fuel injection rate $q_1$ is corrected by using the correction coefficient $K_1$ to obtain an effective fuel injection rate $q_2$, namely, an effective quantity of the fuel to be injected for one driving cycle of the piezoelectric actuator 68. In step 209, a map stored in the ROM 114 is searched for a piezoelectric actuator driving voltage V corresponding to the effective fuel injection rate $q_2$. The ECU 86 applies the driving voltage V to the piezoelectric actuator 68 to drive the piezoelectric actuator 68 Nf times for every fuel injection cycle.

A control program for controlling the electric fuel pump 98 will be described hereinafter with reference to FIG. 8. The CPU 110 executes the control program, for example, every eight milliseconds to control the electric fuel pump 98.

In step 301, a decision is made whether the ignition switch is turned to its "start engine" position. When the step 301 decision is YES, an initial fuel feed pressure $PF_{INT}$ appropriate for starting the engine is set in step 302, and then actual fuel feed pressure $PF_{ACT}$ is detected from the output signal of the pressure sensor 102 in step 303. Then, in step 304, a decision is made whether the actual fuel feed pressure $PF_{ACT}$ is detected from the output signal of the pressure sensor 102 in step 303. Then, in step 304, a decision is made whether the actual fuel feed pressure $PF_{ACT}$ is higher than the initial fuel feed pressure $PF_{INT}$. When the decision in step 304 is NO ($PF_{ACT} < PF_{INT}$), the maximum rotating speed $NP_{MAX}$ of the electric fuel pump 98 is set in step 305, and then the maximum rotating speed $NP_{MAX}$ is applied to the driving circuit of the output unit 116 in step 306. Consequently, the electric fuel pump 98 operates at the maximum rotating speed, so that the fuel is supplied through the fuel pipe 103 and the fuel inlet fixture 54 to fill up the fuel supply passage 56 and pump chambers 46 of the fuel injection device 10. Steps 303 through 306 are repeated until the actual fuel feed pressure $PF_{ACT}$ exceeds the initial fuel feed pressure $PF_{INT}$. When $PF_{ACT} > PF_{INT}$, the fuel pump 98 is stopped in step 307.

When a decision is made in step 301 that the ignition switch has previously been turned on, a decision is made in step 308 whether the actual engine speed is lower than a predetermined value, for example, 400 rpm, to discriminate between normal engine operation and cranking operation. When the engine speed is 400 rpm or below, a detection is made in step 309 whether the starter is on. When the starter is not on, the routine goes to step 307 to stop the electric fuel pump 98. When the starter is on, the fuel must be fed at a rate necessary for cranking. In step 310, a fuel pump speed $NP_{CRK}$ for cranking is set to feed the fuel at the rate necessary for cranking, and then a signal for driving the electric fuel pump 98 at the fuel pump speed $NP_{CRK}$ is provided to the driving circuit in step 311 to feed the fuel to the fuel injection device 10 at a flow rate for cranking, which is smaller than that for the effective operation of the engine.

Figure 9:
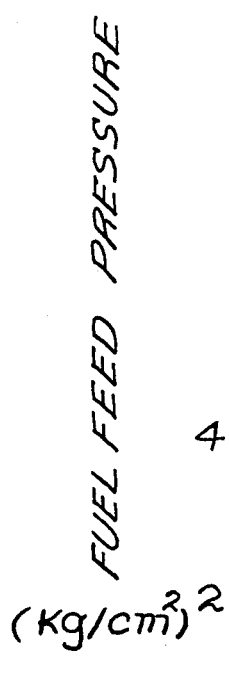
FIG. 9 is a graph showing the variation of fuel feed pressure with fuel injection device driving frequency.

When the decision in step 308 is YES, namely, when the actual engine speed is higher than 400 rpm, it is decided that the engine is being normally operated. Step 312 and the following steps are executed to control the fuel feed pressure according to fuel injection deice driving frequency, namely, the number of operating cycles of the fuel injection device 10 for one fuel injection cycle. That is, in step 312, a fuel injection device driving frequency Nf is read from the RAM. At step 313 a target fuel feed pressure $PF_{DES}$ corresponding to the fuel injection device driving frequency Nf is set on the basis of a map shown in FIG. 9. As is apparent from FIG. 9, it is preferable that the target fuel feed pressure $PF_{DES}$ be maintained fairly constant when the fuel injection device driving frequency Nf is in a frequency range of approximately 250 to 600 Hz, increases according to the fuel injection device driving frequency Nf, and decreases with the decrease of the fuel injection device driving frequency Nf. The upper limit of the target fuel feed pressure is lower than the valve opening pressure of the injection nozzle 26.

In step 314, a target pump speed $NP_{DES}$ corresponding to the target fuel feed pressure $PF_{DES}$ is set. In step 315, the actual pump speed $NP_{ACT}$ is detected from the output signal of the pump speed sensor 100. In step 316, a decision is made whether the actual pump speed $NP_{ACT}$ is higher than the target pump speed $NP_{RES}$ and, when the decision is YES, the pump speed is decreased in step 317. When the decision in step 316 is NO, the pump speed is increased in step 318. Then, a fuel driving signal is given to the driving circuit in step 319. Thus, the fuel feed pressure applied to the fuel injection device 10 is controlled according to the variable fuel injection device driving frequency NF; the fuel feed pressure is enhanced when the engine speed is high requiring a higher driving frequency, while the fuel feed pressure is reduced when the engine speed is low requiring a lower driving frequency.

Incidentally, since the foregoing embodiment varies the fuel feed pressure, the map of the stoichiometric fuel injection rate Q stored in the ROM 114 is determined taking the variation of the fuel feed pressure into account.

A stoichiometric fuel injection rate may be set for a fixed fuel injection device driving frequency range of 250 to 600 Hz in which the fuel feed pressure is held at a constant value and the actual fuel injection rate $q_1$ may be corrected according to the output signal of the pressure sensor 102 instead of previously setting the map of stoichiometric fuel injection rate Q taking the variation of the fuel feed pressure into account.

Since the quantity of expansion or contraction of a piezoelectric material varies with temperature, it is preferable to detect the temperature of the piezoelectric actuator 68 and to correct the voltage to be applied to the piezoelectric actuator according to its temperature. The mode of correction is dependent on the temperature characteristic of the piezoelectric material; when the piezoelectric material has positive temperature characteristic, the voltage is decreased as the temperature rises and, when the piezoelectric material has negative temperature characteristics, the voltage is increased as the temperature rises.

As apparent from the foregoing description, the fuel injection device of the present invention is more reliable than the fuel injection device disclosed in Japanese Patent Provisional Publication (Kokai) No. 61-108865 in uniformly distributing the fuel to the cylinders of a multicylinder engine. Since the fuel injection device of the present invention has the pump 42 having the plurality of pump chambers 46 respectively corresponding to the cylinders of a multicylinder engine and the pumping member 40 is driven by the single piezoelectric actuator 68, the pistons 44 are operated at the same speed and through the same stroke. Accordingly, the same fuel injection pressure is generated in all the pump chambers 46 and is propagated through the individual fuel injection passages 50 to the individual fuel injection nozzles 26, and thereby the fuel injection nozzles 26 inject the fuel at the same fuel injection rate regardless of the difference between the fuel injection passages in passage characteristics.

The fuel injection device. 10 constructed as an integral unit enable the mass production thereof at a reduced cost and easy installation on and removal from an engine.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed:

1. An electronic fuel injection device for feeding fuel to an internal combustion engine comprising:
    (a) a main body having at least two bores therein;
    (b) a pumping member which has at least two pistons, each piston being adapted to be fitted into a respective bore, and a base on which said pistons are formed, each bore and its associated piston forming a pump chamber;
    (c) means for driving said pump member;
    (d) a fuel supply passage for supplying fuel into said pump chambers;
    (e) injection nozzles adapted to be secured to a suction pipe of said internal combustion engine in order to supply fuel thereto when a predetermined pressure of fuel is provided thereto;
    (f) fuel injection passages connecting said injection nozzles to said pump chambers respectively; and (g) a spring member, provided between said main body and said base of said pumping member, for biasing said pumping member in a direction opposite to that in which said pumping member is moved by said driving means.

2. A electronic fuel injection device according to claim 1, wherein said pistons are arranged at equal angular intervals of a circle having its center on an axis of said pumping member.

3. An electronic fuel injection device -according to claim 1, further comprising a sealing member for sealing each pump chamber.

4. An electronic fuel injection device according to claim 1, wherein said spring member is disposed concentrically with said driving means between an upper surface of a central part of said main body, and a surface of a flange of said pumping member in which said pistons are formed.

5. An electronic fuel injection device according to claim 1, wherein respective portions of said fuel injection passages between said corresponding pump chambers and fuel inlet ports of said corresponding fuel injection nozzles are the same in volume.

6. An electronic fuel injection device according to claim 1, wherein each of said injection nozzles has a poppet valve and a spring for continuously biasing said poppet valve in a direction to close.

7. An electronic fuel injection device according to claim 1, further comprising air vent means for removing air and/or vapor from fuel in said fuel injection passages, said fuel supply passage and/or said pump chambers.

8. An electronic fuel injection device according to claim 7, wherein said air vent means comprises an air vent valve disposed in said fuel supply passage.

9. An electronic fuel injection device according to claim 8, wherein said air vent valve is positioned above a fuel inlet port of said fuel supply passage.

10. An electronic fuel injection device according to claim 9, wherein at least a portion of said fuel supply passage is inclined upward toward said air vent valve.

11. An electronic fuel injection device according to claim 7, wherein said air vent means comprises:
   an air vent pipe which is provided between said fuel supply passage and a surge tank of said internal-combustion engine; and
   a valve for opening said air vent pipe, said valve opening when a pressure of a fuel in said fuel supply passage drops below a predetermined value.

12. An electronic fuel injection device according to claim 1, wherein said driving means comprises a piezoelectric actuator having a piezoelectric laminate which expands and contracts in response to an electric signal.

13. An electronic fuel injection device according to claim 12, further comprising:
   an extension element attached to said piezoelectric laminate; and
   an adjusting screw for adjusting said extension.

14. An electronic fuel injection device according to claim 12, wherein said piezoelectric actuator comprises a casing secured detachably to said main body in order that said main body and said piezoelectric actuator can be separately replaced.

15. An electronic fuel injection device for feeding fuel to an internal combustion engine comprising:

(a) a main body having a central part in which at least two bores and a fuel supply passage connected to said bores are formed, said fuel supply passage having branch parts which have ends provided at a predetermined portions of suction pipes of said internal combustion engine;

(b) fuel injection nozzles which are secured to said ends of said branch parts, respectively for feeding fuel therefrom into suction pipes of said internal combustion engine;

(c) a pumping member which has at least two pistons, one fitted in each of said bores respectively and which can be moved at a high speed to cause fuel in said bores to pressurize;

(d) means for driving said pumping member, which contacts with said pumping member and is secured at a predetermined portion on said main body; and (e) a spring member which is provided at a portion between said central part of said main body and said pumping member and continuously biases said pumping member in a direction opposite to that in which said pumping member moves to pressurize fuel in said bores.

16. An electronic fuel injection device according to claim 15, wherein
   said pumping member is provided on an upper surface of said central part of said main body, and
   said driving means comprises a casing which is secured detachably to said upper surface of said main body and a piezoelectric actuator which is accommodated in said casing.

17. An electronic fuel injection device according to claim 16, further comprising:
   an extension member attached to said piezoelectric actuator; and
   adjusting screw means for adjusting said extension, said adjusting screw means being provided at a portion opposite to the portion where said piezoelectric actuator contacts with said pumping member in said casing.

18. An electronic fuel injection device according to claim 15, wherein said pistons of said pumping member are arranged at equal angular intervals of a circle having its center on an axis of said pumping member.

19. An electronic fuel injection device according to claim 15, wherein said spring member is disposed concentrically with said driving means between upper surface of said central part of said main body and a surface of said pumping member on which said pistons are formed.

20. An electronic fuel injection device according to claim 15, further comprising air vent means for removing air and/or vapor from fuel in said fuel injection passages, said fuel supply passage and/or said bores.

21. An electronic fuel injection device according to claim 15, further comprising means for controlling a rate of fuel injection of said electronic fuel injection device by regulating a voltage and number of voltage application cycles applied to said driving means.

22. An electronic fuel injection device according to claim 21, further comprising a controlling means for controlling an electric fuel pump of said internal combustion engine so as to control fuel feed pressure in accordance with said voltage application cycles.

* * * * *